US010854002B2

(12) United States Patent
Nasi et al.

(10) Patent No.: US 10,854,002 B2
(45) Date of Patent: Dec. 1, 2020

(54) INTERACTIVE VEHICLE WINDOW SYSTEM INCLUDING AUGMENTED REALITY OVERLAYS

(71) Applicant: Verizon Patent and Licensing Inc., Arlington, VA (US)

(72) Inventors: Elvis Nasi, Albany, NY (US); Srinivasa M. Kalapala, Hillsborough, NJ (US); Abraham Arencibia, Secaucus, NJ (US); Jesus F. Cabrera, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 42 days.

(21) Appl. No.: 15/699,372

(22) Filed: Sep. 8, 2017

(65) Prior Publication Data

US 2019/0080514 A1    Mar. 14, 2019

(51) Int. Cl.
| | |
|---|---|
| *G06T 19/00* | (2011.01) |
| *B60R 1/00* | (2006.01) |
| *B64C 39/02* | (2006.01) |
| *G02F 1/1334* | (2006.01) |
| *G02F 1/1333* | (2006.01) |
| *G02F 1/137* | (2006.01) |
| *G06F 3/041* | (2006.01) |

(52) U.S. Cl.
CPC ............ *G06T 19/006* (2013.01); *B60R 1/001* (2013.01); *B64C 39/024* (2013.01); *G02F 1/137* (2013.01); *G02F 1/1334* (2013.01); *G02F 1/13338* (2013.01); *B64C 2201/127* (2013.01); *G06F 3/041* (2013.01)

(58) Field of Classification Search
None
See application file for complete search history.

(56) References Cited

U.S. PATENT DOCUMENTS 7,616,129 B2 * 11/2009 Thacher ............... G08G 1/0962
340/905
10,049,402 B1 * 8/2018 Miranda ................ G06Q 20/40
(Continued)

OTHER PUBLICATIONS

Lockheed Martin, "Mars Experience" Lockheed Martin Corporation, http://lockheedmartin.com/generationbeyond/mars-experience, 2016, 2 pages.
(Continued)

*Primary Examiner* — Andrew G Yang

(57) ABSTRACT

A device may identify first content to be provided for display via a window system of a vehicle. The device may provide, for display via the window system of the vehicle, information associated with the first content as a first augmented reality overlay based on identifying the first content. The device may receive information associated with a user interaction with the window system of the vehicle based on providing, for display via the window system of the vehicle, the information associated with the first content as the first augmented reality overlay. The device may identify second content based on the information associated with the user interaction with the window system of the vehicle. The device may provide, for display via the window system of the vehicle, information associated with the second content based on identifying the second content.

20 Claims, 8 Drawing Sheets

(56) References Cited

U.S. PATENT DOCUMENTS

| | | | | |
|---|---|---|---|---|
| 2004/0046708 A1* | 3/2004 | Yurusov | ............ | G09F 19/22 345/1.3 |
| 2011/0058113 A1* | 3/2011 | Threlkel | ............ | G02F 1/13336 349/1 |
| 2012/0256945 A1* | 10/2012 | Kidron | ............ | A63G 31/16 345/619 |
| 2013/0147840 A1* | 6/2013 | Seder | ............ | G06T 3/005 345/633 |
| 2013/0218721 A1* | 8/2013 | Borhan | ............ | G06Q 20/322 705/26.41 |
| 2014/0165111 A1* | 6/2014 | Ko | ............ | H04N 21/242 725/74 |
| 2015/0077337 A1* | 3/2015 | Coto-Lopez | ............ | B64D 11/0015 345/156 |
| 2015/0186984 A1* | 7/2015 | Loganathan | ............ | G06Q 30/0641 705/27.1 |
| 2016/0034042 A1* | 2/2016 | Joo | ............ | G02B 27/0172 345/633 |
| 2016/0093105 A1* | 3/2016 | Rimon | ............ | G06T 19/006 345/633 |
| 2016/0372083 A1* | 12/2016 | Taite | ............ | G06F 3/017 |
| 2016/0375766 A1* | 12/2016 | Konet | ............ | B60K 35/00 348/148 |
| 2017/0010218 A1* | 1/2017 | He | ............ | G02F 1/172 |
| 2017/0251180 A1* | 8/2017 | Smolyanskiy | ............ | G05D 1/0016 |
| 2017/0294046 A1* | 10/2017 | Soda | ............ | G06T 7/20 |
| 2017/0330034 A1* | 11/2017 | Wang | ............ | G05D 1/0088 |
| 2018/0015810 A1* | 1/2018 | Chelian | ............ | B60J 3/04 |
| 2018/0158102 A1* | 6/2018 | Choi | ............ | G06Q 30/0251 |
| 2018/0270542 A1* | 9/2018 | Ramalingam | ............ | B60R 1/00 |
| 2019/0332447 A1* | 10/2019 | Kirisken | ............ | A63F 13/214 |

OTHER PUBLICATIONS

Framestore VR Studio, "The Field Trip to Mars", http://framestorevr.com/field-trip-to-mars/, 2016, 5 pages.

* cited by examiner

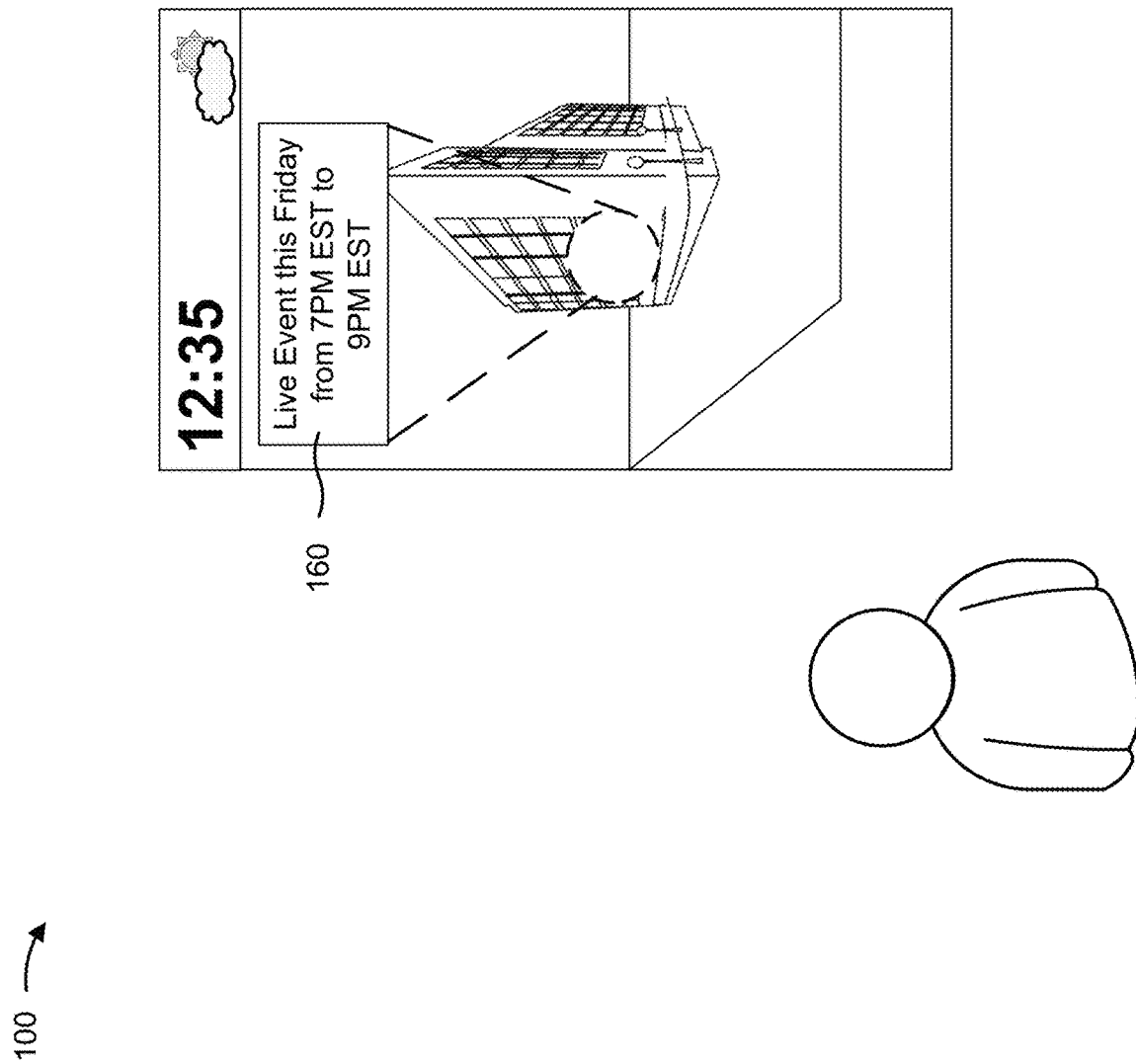

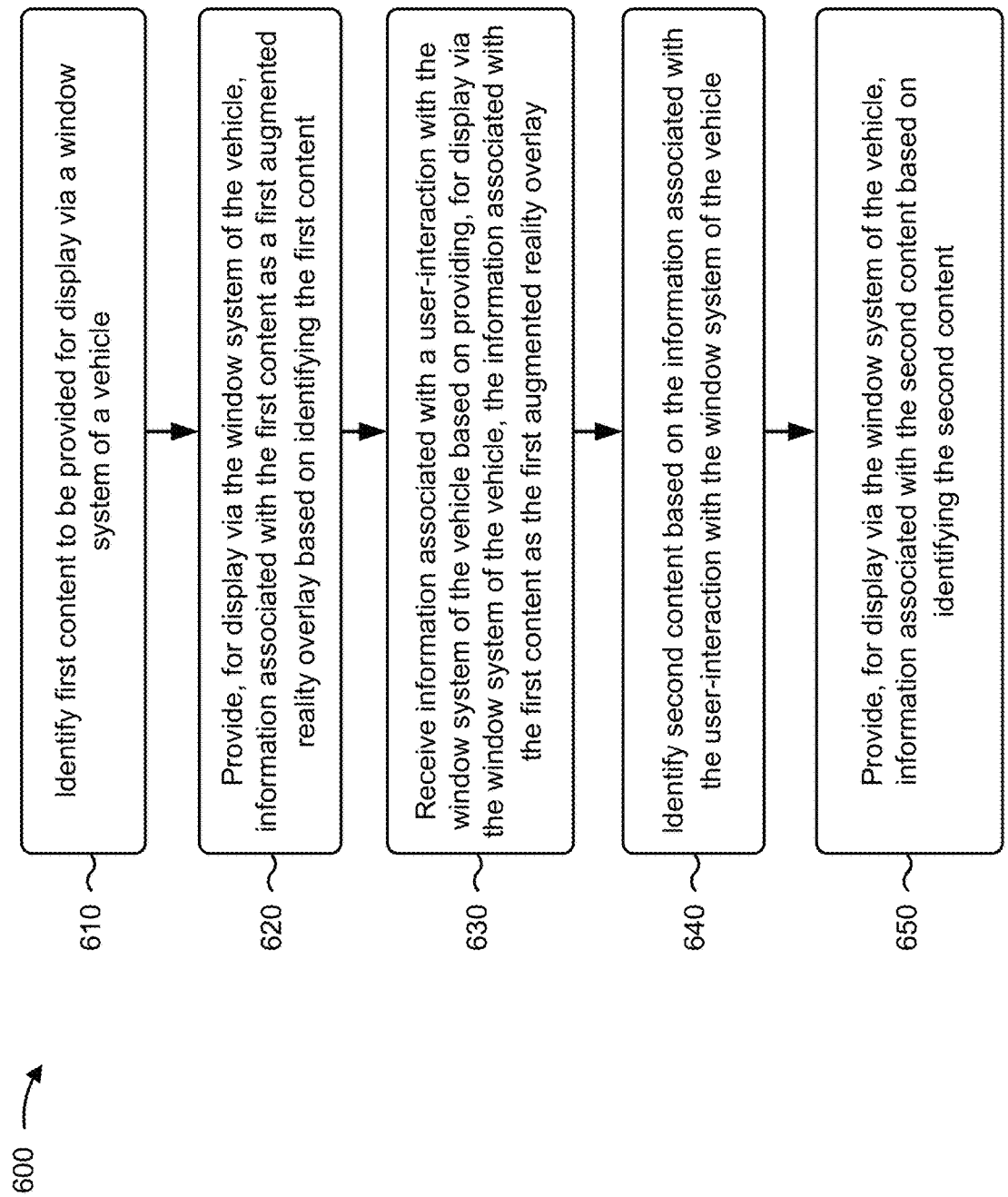

INTERACTIVE VEHICLE WINDOW SYSTEM INCLUDING AUGMENTED REALITY OVERLAYS

BACKGROUND

Augmented reality applications enable a user, utilizing a device, to view a real-world environment that is augmented by computer-generated content, such as images, video, text, and/or the like. For example, the device may provide, for display, a view of real-world surroundings of the user that may include superimposed content.

BRIEF DESCRIPTION OF THE DRAWINGS

FIGS. 1A-1C are diagrams of an overview of an example implementation described herein;

FIG. 6 is a flow chart of an example process for providing interactive content via augmented reality overlays associated with a vehicle window system.

DETAILED DESCRIPTION OF PREFERRED EMBODIMENTS

Figure 1A:
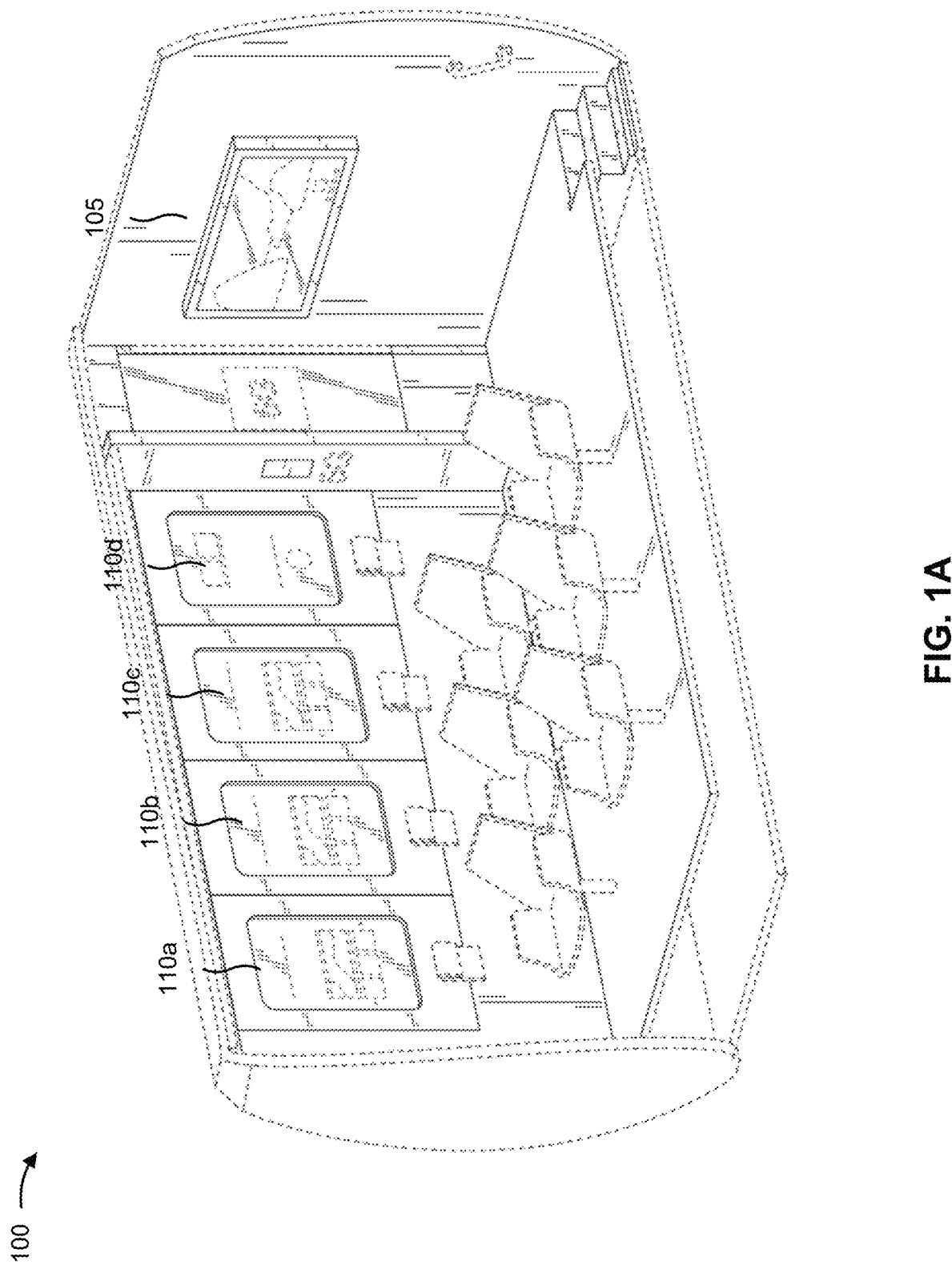

The following detailed description of example implementations refers to the accompanying drawings. The same reference numbers in different drawings may identify the same or similar elements.

Users often view and interact with content using user devices, such as smart phones, tablet computers, laptop computers, smart eyeglasses, etc. Often, such user devices include display screens that are of limited size, include limited processing capability, include data constraints, and/or the like. As such, the amount and nature of content that is capable of being provided to such user devices and/or for display by such user devices is often times limited.

With the advent of fifth generation (5G) networks, the amount of available content and the speed at which the content may be received is slated to increase. However, user devices may be unable to efficiently receive, process, and provide the content for display, and may be unable to present the content to users in immersive and engaging ways.

Some implementations described herein provide a vehicle system that includes a set of window systems. Each window system may include an interactive touch overlay, a display, a backlight, and/or a smart film. The vehicle system may identify content to be provided for display, and provide, for display via the window systems, information associated with the content as augmented reality overlays. Occupants of a vehicle, that includes the vehicle system, may interact with the window systems to select content to be provided for display, interact with the content, and/or the like. The window systems may be controlled independently of one another, to allow for different content to be displayed on each window system concurrently. The window systems may be controlled such that content display can be coordinated across multiple window systems simultaneously to allow for duplicated content or synchronized content (e.g., to give the appearance of a single, larger display).

In this way, some implementations described herein permit real-world surroundings of vehicles (e.g., public transit vehicles, cars, autonomous vehicles, busses, planes, trains, etc.) to be augmented by augmented reality overlays that are superimposed in association with the real-world surroundings. Additionally, in this way, some implementations described herein permit occupants of vehicles to interact with the augmented reality overlays to identify information associated with the real-world surroundings, to select content for playback, and/or the like.

Further still, in this way, some implementations described herein permit occupants of vehicles to view and/or interact with content that is being provided for display by displays that are substantially larger than display screens associated with user devices. Thereby, some implementations described herein enhance a user experience associated with content consumption.

Some implementations described herein provide a vehicle system that includes radio access network connectivity and/or is capable of connecting to external data networks. The vehicle system includes embedded hardware, firmware, software, and/or a combination thereof, that permits the vehicle system to receive content, and provide the content for display via window systems of the vehicle. In this way, some implementations described herein reduce a number of requests, by user devices associated with occupants of vehicles, for content, and also reduce an amount of content that is to be provided to individual user devices. In this way, some implementations described herein conserve user device processor and/or memory resources, reduce data consumption associated with user devices, conserve network resources, conserve processor and/or memory resources associated with network resources, conserve battery resources of user devices, and/or the like.

While implementations herein describe window systems that are implemented in association with vehicle systems, it should be understood that implementations herein are applicable to other types of systems that may incorporate window systems, such as systems associated with a static display, a venue (e.g., within a luxury suite of a stadium), a business (e.g., within a conference room, an office, and/or the like), a restaurant, a smart kiosk, and/or the like.

Figure 1B:
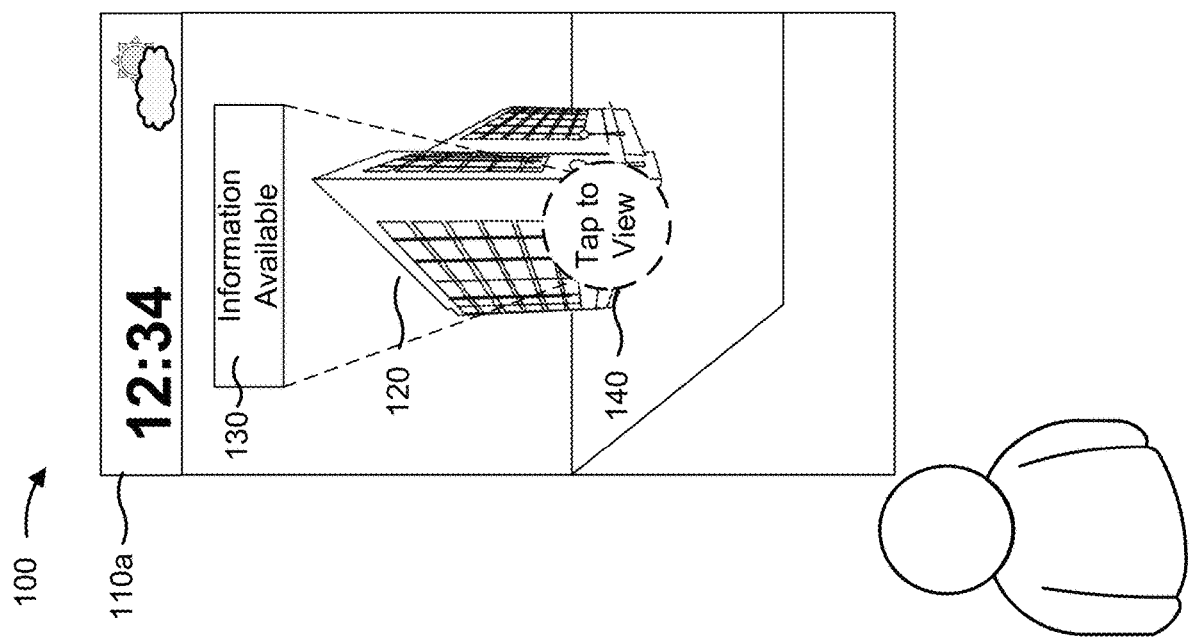

FIGS. 1A-1C are diagrams of an overview of an example implementation 100 described herein. As shown in FIG. 1A, a vehicle system, of a vehicle, may include a set of window systems 110a-110d and a display 105. For example, the vehicle may include a bus, an automobile, a plane, a train, a boat, and/or the like. Each respective window system 110 may include a touch overlay that is capable of detecting touch gestures, a display that is capable of displaying content, and/or a smart film that is capable of transitioning from an opaque state to a transparent state. Display system 105 may comprise a known display technology, such as a liquid crystal display (LCD) or a light emitting diode (LED) display, that does not have a touch overlay and/or a smart film.

In this way, occupants of the vehicle may view real-world surroundings of the vehicle via window systems 110a-110d, may view content that is being provided for display via window systems 110a-110d, and/or may interact with window systems 110a-110d to select content that is to be provided for display. While a particular number of window systems are shown in FIG. 1A, it should be understood that a vehicle may include another number of window systems and/or a different arrangement of window systems.

As shown in FIG. 1B, a particular window system 110a may provide, for display, an augmented reality overlay 140 that is superimposed in association with a real-world geographic feature 120. For example, assume that the real-world geographic feature (e.g., a building) is viewable through window system 110a. In this case, the vehicle system may identify that the real-world geographic feature is viewable via window system 110a (e.g., based on geolocation information of the vehicle, based on a position and/or an orientation of window system 110a, based on map data, based on metadata associated with content, and/or the like).

Additionally, in this case, the vehicle system may identify content associated with real-world geographic feature 120 based on received information, stored information, and/or the like. For example, the vehicle system may identify content associated with real-world geographic feature 120, and may provide, for display via window system 110a, an augmented reality overlay 130 indicating that content is available.

As further shown in FIG. 1B, and by reference number 150, an occupant of the vehicle may perform a touch gesture (e.g., a tap) in association with another augmented reality overlay 140 instructing the occupant to perform the touch gesture. For example, assume that the occupant desires to identify information associated with real-world geographic feature 120.

As shown in FIG. 1C, the vehicle system may provide, for display via window system 110a, an augmented reality overlay 160 based on detecting the user interaction with window system 110a (e.g., the user interaction with other augmented reality overlay 140). For example, as shown, the vehicle system may provide, for display via window system 110a, updated information associated with real-world geographic feature 120. In this way, the occupant of the vehicle may identify information associated with real-world surroundings of the vehicle as the vehicle moves throughout a geolocation.

While particular content and/or augmented reality overlays are depicted in FIGS. 1A-1C, it should be understood that other types of content and/or augmented reality overlays may be provided for display.

As indicated above, FIGS. 1A-1C are provided merely as an example. Other examples are possible and may differ from what was described with regard to FIGS. 1A-1C.

Figure 2:
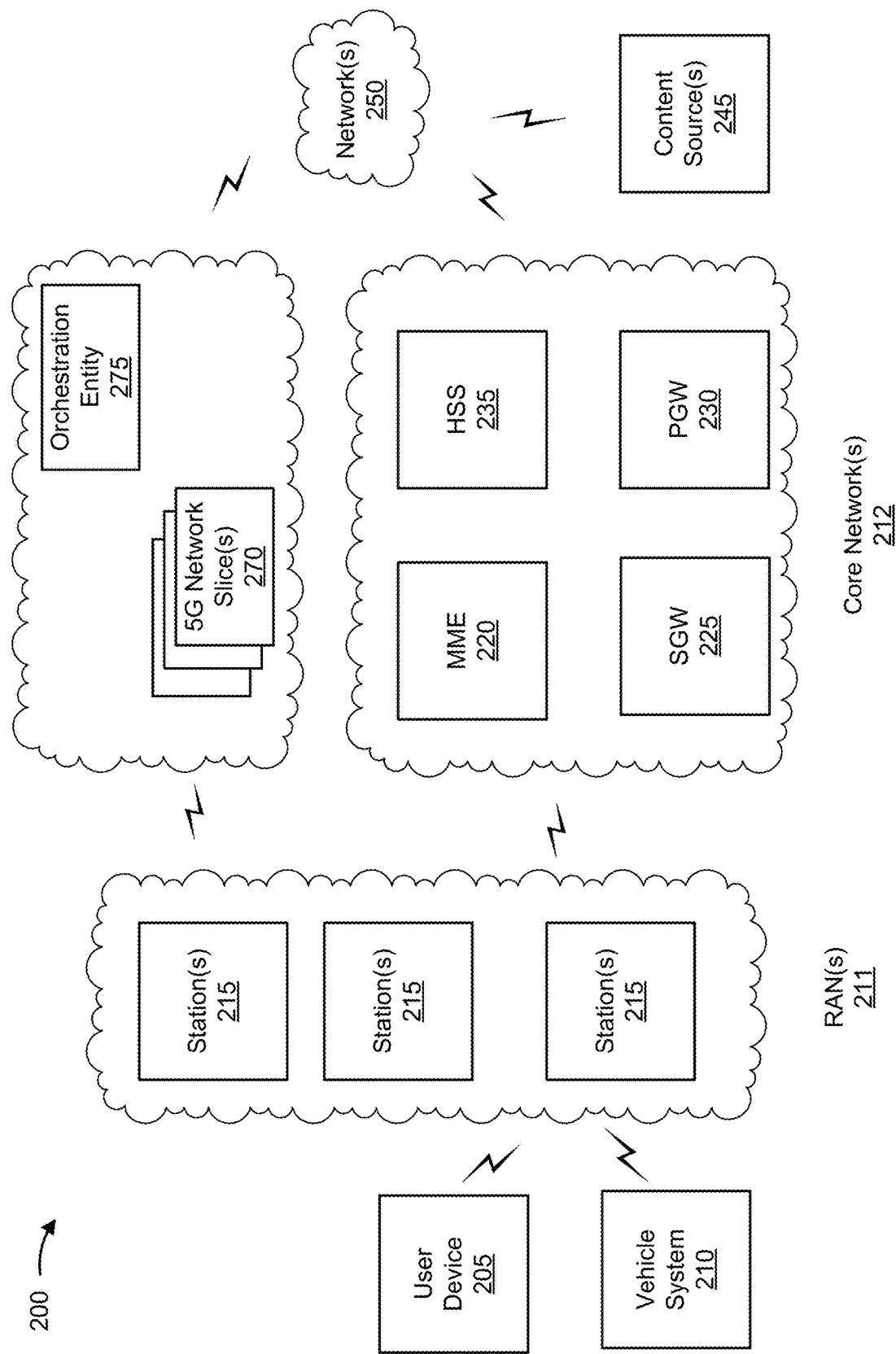
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a vehicle system 210, one or more Radio Access Networks (RAN(s)) 211, one or more Core Networks 212, a content sources 245, and one or more connecting networks 250. Devices of environment 200 may interconnect via wired connections, wireless connections, or a combination of wired and wireless connections.

Some implementations are described herein as being performed within a long term evolution (LTE) network for explanatory purposes. Some implementations may be performed using elements that are not typical for an LTE network, such as a 5G network, a third generation (3G) network, a cloud computing network, or another type of next generation network.

In cases where an LTE network is included in the RANs 211 and/or Core Networks 212, environment 200 may include an evolved packet system (EPS) that operate based on a third generation partnership project (3GPP) LTE wireless communication standard. The LTE network may include a RAN as part of RANs 211 and an evolved packet core (EPC) as part of Core Networks 212. The LTE RAN may include one or more stations 215 take the form of evolved Node Bs (eNBs) via which user device 205 and/or vehicle system 210 communicates through environment 200, as well as associated antennas and antenna systems to provide physical layer connectivity. The EPC may include MME 220, SGW 225, HSS 235 and/or PGW 230 that enable user device 205 and/or vehicle system 210 to communicate with content source 245 and/or network(s) 250.

In cases where a 5G network is included in the RANs 211 and/or Core Networks 212, environment 200 may include network elements that operate based on a 3GPP 5G wireless communication standard. The RAN 211 may include stations 215 that include elements that implement a 5G radio interface via which user device 205 and/or vehicle system 210 communicate through environment 200, including associated antennas and antenna systems. The core network 212 may include one or more 5G network slices 270 under the management of orchestration entity 275, that enable user device 205 and/or vehicle system 210 to communicate with content source 245 or network(s) 250.

User device 205 includes one or more devices capable of communicating with stations 215 and/or a network (e.g., network 250). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a machine-to-machine (M2M) device, an Internet of Things (IoT) device (e.g., any "thing" in the IoT), and/or a similar device. User device 205 may send network traffic to and/or receive network traffic from network 250 (e.g., via stations 215 and core network(s) 212).

Vehicle system 210 includes one or more devices capable of providing, for display via a window system of a vehicle, information associated with content as an augmented reality overlay. In some implementations, vehicle system 210 may be associated with a vehicle. For example, a vehicle may include an automobile, a bus, a boat, a plane, heavy equipment, a motorcycle, a train, a subway, a monorail, a trolley, a golf cart, and/or the like.

Station 215 includes one or more devices capable of transferring network traffic, such as audio, video, text, and/or other network traffic, destined for and/or received from user device 205 and/or vehicle system 210. In some implementations, a station 215 may include an eNB associated with the LTE network that receives network traffic from and/or sends network traffic to network 250 via SGW 225 and/or PGW 230. Additionally, or alternatively, one or more stations 215 may be associated with a RAN that is not associated with the LTE network, such as a 5G RAN. Station 215 may send network traffic to and/or receive network traffic from user device 205 and/or vehicle system 210 via an air interface. In some implementations, station 215 may include a small cell base station, such as a base station of a microcell, a picocell, and/or a femtocell. Station 215 may also include antenna systems such a distributed antenna systems, and associated fronthaul or other data transport facilities.

MME 220 includes one or more devices, such as one or more server devices, capable of managing authentication, activation, deactivation, and/or mobility functions associated with user device 205 and/or vehicle system 210. In some implementations, MME 220 may perform operations relating to authentication of user device 205 and/or vehicle system 210. Additionally, or alternatively, MME 220 may facilitate the selection of a particular SGW 225 and/or a particular PGW 230 to serve network traffic to and/or from user device 205 and/or vehicle system 210. MME 220 may perform operations associated with handing off user device 205 and/or vehicle system 210 from a first station 215 to a second station 215 when user device 205 and/or vehicle system 210 is transitioning from a first cell associated with the first station 215 to a second cell associated with the second station 215. Additionally, or alternatively, MME 220 may select another MME (not pictured), to which user device 205 and/or vehicle system 210 should be handed off (e.g., when user device 205 and/or vehicle system 210 moves out of range of MME 220).

SGW 225 includes one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers network traffic. In some implementations, SGW 225 may aggregate network traffic received from one or more stations 215 associated with the LTE network, and may send the aggregated network traffic to network 250 (e.g., via PGW 230) and/or other network devices associated with the EPC. SGW 225 may also receive network traffic from network 250 and/or other network devices, and may send the received network traffic to user device 205 and/or vehicle system 210 via station 215. Additionally, or alternatively, SGW 225 may perform operations associated with handing off user device 205 and/or vehicle system 210 to and/or from an LTE network.

PGW 230 includes one or more devices capable of providing connectivity for user device 205 and/or vehicle system 210 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers network traffic. In some implementations, PGW 230 may aggregate network traffic received from one or more SGWs 225, and may send the aggregated network traffic to network 250. Additionally, or alternatively, PGW 230 may receive network traffic from network 250, and may send the network traffic to user device 205 and/or vehicle system 210 via SGW 225 and station 215. PGW 230 may record data usage information (e.g., byte usage), and may provide the data usage information to AAA 240.

HSS 235 includes one or more devices, such as one or more server devices, capable of managing (e.g., receiving, generating, storing, processing, and/or providing) information associated with user device 205 and/or vehicle system 210. For example, HSS 235 may manage subscription information associated with user device 205 and/or vehicle system 210, such as information that identifies a subscriber profile of a user associated with user device 205 and/or vehicle system 210, information that identifies services and/or applications that are accessible to user device 205 and/or vehicle system 210, location information associated with user device 205 and/or vehicle system 210, a network identifier (e.g., a network address) that identifies user device 205 and/or vehicle system 210, information that identifies a treatment of user device 205 and/or vehicle system 210 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

Content source 245 includes one or more devices capable of receiving, generating, storing, processing, and/or providing network traffic. For example, content source 245 may include a server device (e.g., a host server, a web server, an application server, etc.), a data center device, or a similar device.

Network 250 includes one or more wired and/or wireless networks. For example, network 250 may include a cellular network (e.g., a 5G network, an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Orchestration entity 275 implements facilities to instantiate and manage 5G Network slices 270. 5G network slices 270 comprise those facilities used to transport user data traffic across core network 212 according to the control and routing protocols established by the orchestration entity 275 (which may be dependent on the type of data traffic to be transported, for example). In example embodiments, the orchestration entity 275 and 5G network slices 270 are implementations of 5G-enabled network function virtualization techniques that allow for scalable deployment of network architectures to enable configurable, low-latency data transport.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
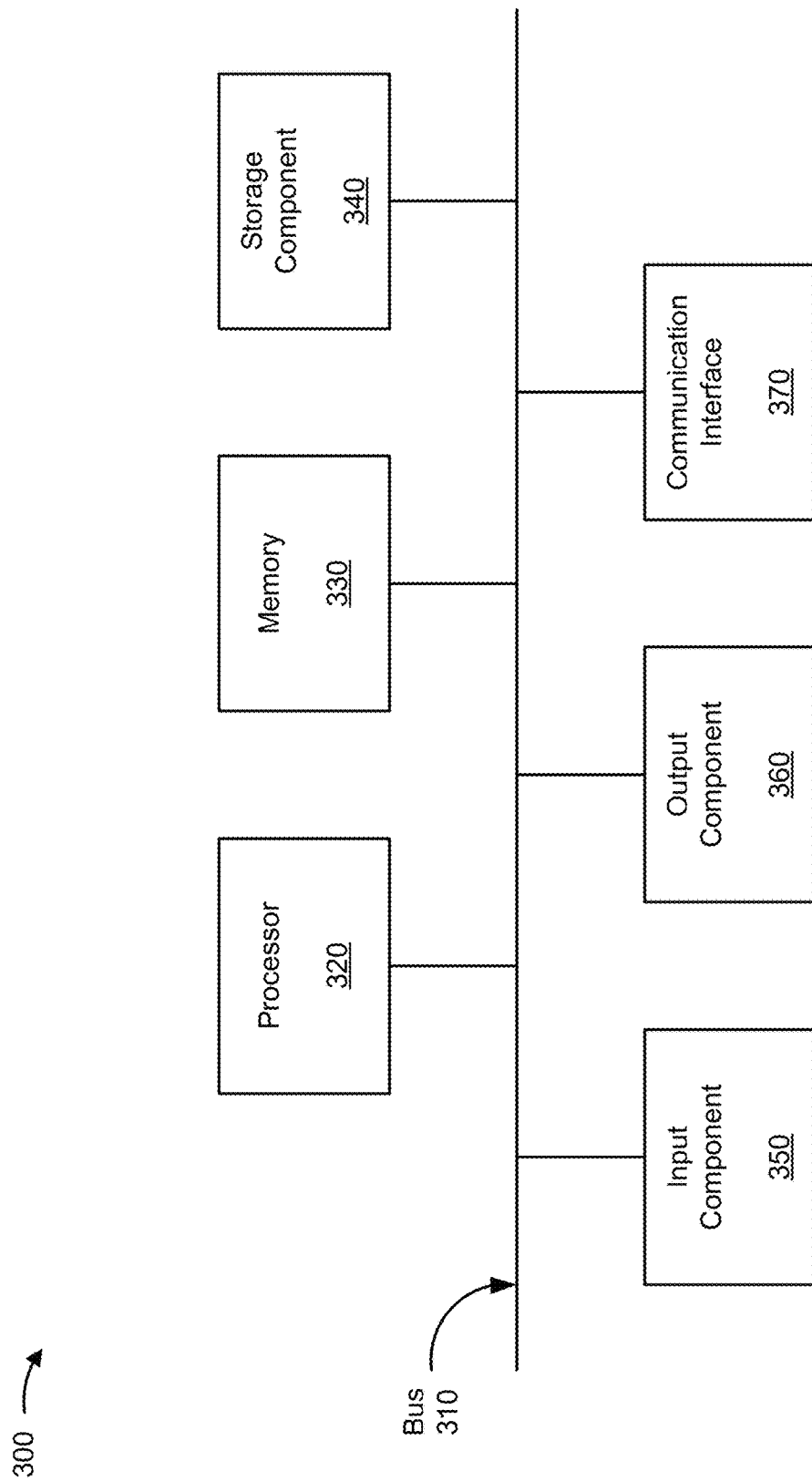
FIG. 3 is a diagram of example components of one or more devices of FIG. 2.

FIG. 3 is a diagram of example components of a device 300. Device 300 may correspond to user device 205, vehicle system 210, stations 215, MME 220, SGW 225, PGW 230, HSS 235, and/or content source 245. In some implementations, user device 205, vehicle system 210, station 215, MME 220, SGW 225, PGW 230, HSS 235 and/or content source 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
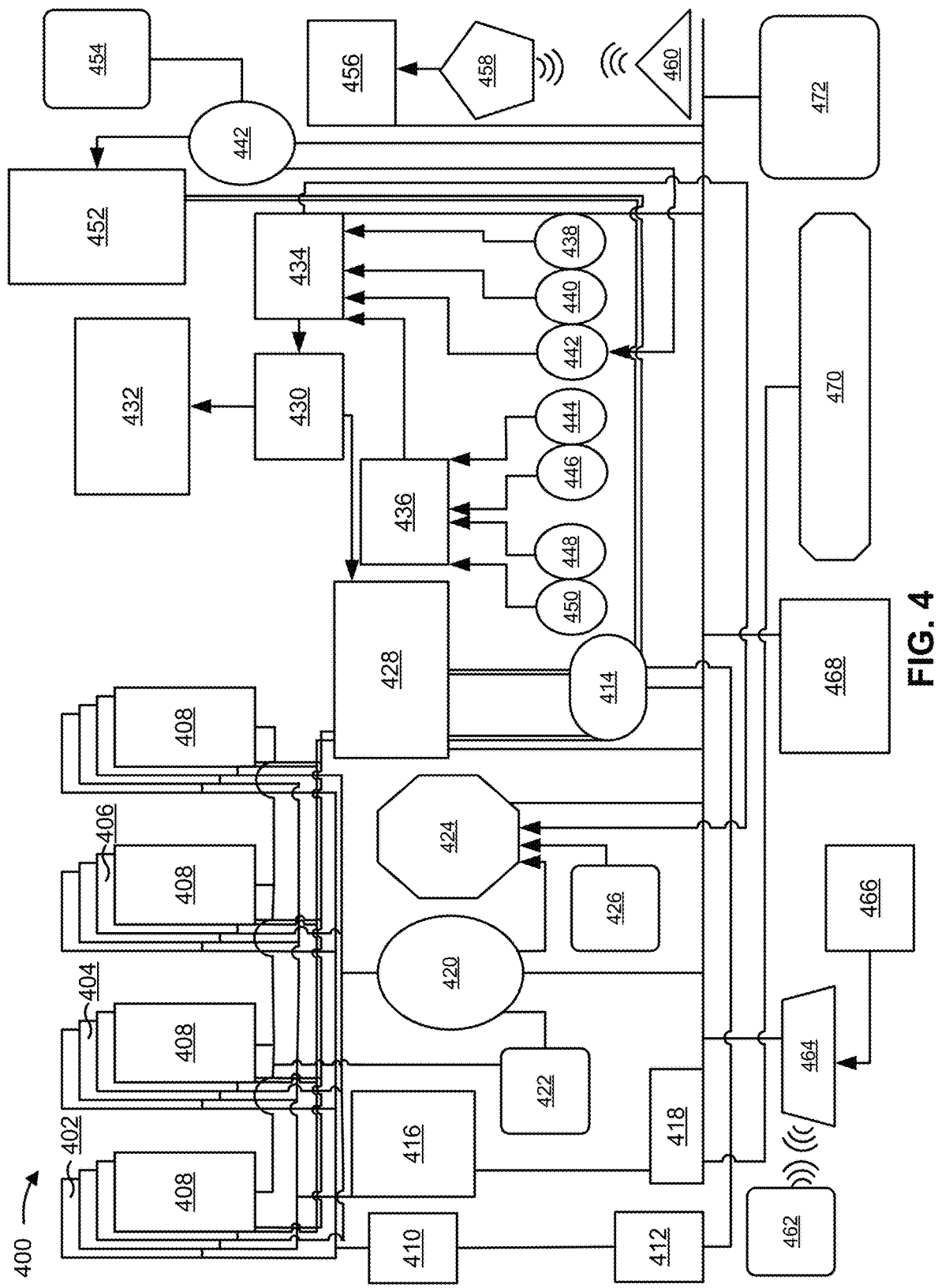
FIG. 4 is another diagram of example components of one or more devices of FIG. 2.

FIG. 4 is a diagram of example components of a device 400. Device 400 may correspond to vehicle system 210. In some implementations, vehicle system 210 may include one or more devices 400 and/or one or more components of device 400. As shown in FIG. 4, device 400 may include a smart film 402, a backlight 404, a display 406, and an interactive touch overlay 408. In some implementations, smart film 402, backlight 404, display 406, and/or interactive touch overlay 408 may form a window system 110.

As further shown in FIG. 4, device 400 may include a smart film power supply 410, a power relay 412, a control processor 414, a backlight controller 416, a network switch 418, a video source 420, a USB hub 422, an audio amplifier switcher 424, an auxiliary port 426, a rear monitor 428, a distribution amplifier 430, a front monitor 432, a first input video switcher 434, a second input video switcher 436, a wall plate video input 438, an unmanned aerial vehicle (UAV) next unit of computing (NUC) device 440, a secondary video source 442, a looping NUC device 444, a customer premises equipment (CPE) 5G throughput device 446, a 4K video over 5G device 448, a port 450, a digital mirror 452, a radio-frequency identification (RFID) sensor 454, a UAV feed video encoder 456, a UAV handset 458, a UAV 460, a control unit 462, a control network router 464, a router 466, a vehicle control panel 468, an ambient lighting device 470, and a CPE rack 472. Device 400 may include additional components not explicitly shown in FIG. 4, but common in systems that display or ingest audio and/or video content (e.g., speakers, microphones, ambient lighting, amplifiers, splitters, filters, switches, displays).

In some implementations, device 400 may perform one or more processes described herein. Device 400 may perform these processes based on a processor executing software instructions associated with a software stack including various languages (e.g., Java, JavaScript, WebGl, C++, Unix, cascading style sheets (CSS), hypertext markup language fifth version (HTML5), and/or the like), various frameworks (e.g., OpenFrameworks, velocity.js, pixi.js, react.js, LESS, jQuery, Express, handlebarsjs, NGINX, node.js, npm, Pm2, and/or the like), and/or various communication protocols (e.g., hypertext transfer protocol (HTTP), transmission control protocol (TCP), user datagram protocol (UDP), open sound control (OSC) protocol, tangible user interface objects (TUIO) protocol, digital multiplex (DMX) protocol, and/or the like).

In some implementations, device 400 may implement request animation frame (RAF) techniques to perform synchronization of content between displays 406, rear monitor 428, front monitor 432, digital mirror 452, user devices 205, and/or the like.

Smart film 402 includes a component that is capable of adjusting light transmission between transparent and opaque using alternating current (AC) power. For example, smart film 402 may include a polymer dispersed liquid crystal (PDLC) film including liquid crystal molecules (microdroplets). When the microdroplets are disordered, smart film 402 prevents light from penetrating smart film 402 thereby rendering smart film 402 opaque. When power is applied to smart film 402, the microdroplets are forced into alignment, rendering smart film 402 transparent. In other words, smart film 402 may transition from an opaque state to a transparent state, and vice versa. Smart film 402 connects to smart film power supply 410.

Backlight 404 includes a component that is capable of adjusting a brightness associated with display 406. Backlight 404 connects to backlight controller 416.

Display 406 includes a component that is capable of displaying content. In some implementations, display 406 includes a liquid crystal display (LCD), and is translucent. Display 406 connects to video source 420.

Interactive touch overlay 408 includes a component that is capable of receiving information associated with a user interaction (e.g., a touch gesture performed by a user). Interactive touch overlay 408 connects to USB hub 422. In some implementations, interactive touch overlay 408 is translucent.

Smart film power supply 410 includes a component that is capable of applying power to smart film 402, and converting power between a power range (e.g., between 70 volts to 120 volts). Smart film power supply 410 connects to smart film 402 and connects to USB hub 422.

Power relay 412 includes a component that is capable of providing power to smart film 402 and/or preventing power from being provided to smart film 402. Power relay 412 connects to, and is controlled by, control processor 414.

Control processor 414 includes a component that is capable of controlling unit handling, audio, video, switching, lighting, door operation, and/or the like, associated with a vehicle. Control processor 414 connects to network switch 418.

Backlight controller 416 includes a component that is capable of controlling ambient lighting and backlight 404 and/or display 406. Backlight controller 416 connects to backlight 404 and network switch 418.

Network switch 418 includes a component that is capable of providing Wi-Fi connectivity to user devices 205. Network switch 418 connects to router 466.

Video source 420 includes a component that is capable of providing content to display 406. Video source 420 connects to control processor 414.

USB hub 422 includes a component that is capable of providing information associated with an input received by interactive touch overlay 408. USB hub 422 connects to interactive touch overlay 408 and video source 420.

Audio amplifier switcher 424 includes a component that is capable of amplifying audio output associated with audio output components of a device 400. Audio amplifier switcher 424 connects to audio output components (e.g., speakers, sub-woofers, etc.) associated with device 400.

Auxiliary port 426 includes a component that is capable of permitting auxiliary input of audio signals associated with user device 205. Auxiliary port 426 connects to audio amplifier switcher 424 and/or a video switcher.

Rear monitor 428 includes a component that is capable of providing, for display, content (e.g., real-time content captured by UAV 460), live 5G network metric value data (e.g., throughput measurements, latency measurements, bandwidth measurements, and/or the like), pre-recorded content, and/or the like. Rear monitor 428 connects to distribution amplifier 430, a video switcher, and/or control processor 414.

Distribution amplifier 430 includes a component that is capable of receiving a video output from a video switcher (e.g., first input video switcher 434 and/or second input video switcher 436) and providing the video output to rear monitor 428 and front monitor 432.

Front monitor 432 includes a component that is capable of providing, for display, content. Front monitor 432 connects to distribution amplifier 430, a video switcher, and/or control processor 414.

First input video switcher 434 includes a component that is capable of executing a user-selection of content for front monitor 432 and/or rear monitor 428. First input video switcher 434 connects to wall plate video input 438, UAV NUC device 440, secondary video source 442, and second input video switcher 436.

Second input video switcher 436 includes a component that is capable of executing a user-selection of content for front monitor 432 and/or rear monitor 428. Second input video switcher 436 connects to first input video switcher 434.

Wall plate video input 438 includes a component that is capable of permitting an external content source to provide input video signals to front monitor 432 and/or rear monitor 428.

UAV NUC device 440 includes a component that is capable of processing real-time video content captured by UAV 460. UAV NUC device 440 connects to first input video switcher 434.

Secondary video source 442 includes a component that is capable of providing content (e.g., pre-recorded content, and/or the like) to front monitor 432, rear monitor 428, and/or to digital mirror 452. Secondary video source 442 connects to second input video switcher 436, digital mirror 452, and/or RFID sensor 454.

Looping NUC device 444 includes a component that is capable of providing content (e.g., looping content, and/or the like) to front monitor 432, and/or rear monitor 428. Looping NUC device 444 connects to second input video switcher 436.

CPE 5G throughput device 446 includes a component that is capable of providing real-time video content (e.g., real-time 5G network metric value measurements associated with CPE rack 472) to front monitor 432, and/or rear monitor 428. CPE 5G throughput device 446 connects to second input video switcher 436.

4K video over 5G device 448 includes a component that is capable of providing real-time 4K content to front monitor 432, and/or rear monitor 428. 4K video over 5G device 448 connects to second input video switcher 436.

Port 450 includes a component that is capable of receiving an input signal, and providing content associated with the input signal to front monitor 432, and/or rear monitor 428. Port 450 connects to second input video switcher 436.

Digital mirror 452 includes a component that is capable of providing, for display, content. In some implementations, digital mirror 452 may receive information associated with a user of user device 205, and provide, for display, the information associated with the user. Digital mirror 452 connects to secondary video source 442.

RFID sensor 454 includes a component that is capable of reading RFID cards associated with users. RFID sensor 454 connects to digital mirror 452.

UAV feed video encoder 456 includes a component that is capable of encoding real-time video content from UAV 460 and/or data sensed by a set of sensors associated with UAV 460. UAV feed video encoder 456 connects to network switch 418, UAV handset 458, and/or sensors associated with UAV 460.

UAV handset 458 includes a component that is capable of receiving real-time video content from UAV 460 and providing the real-time video content to UAV feed video encoder 456. UAV handset 458 connects to UAV feed video encoder 456.

UAV 460 includes an aircraft, without a human pilot, that may be controlled either autonomously by onboard computers or by remote control of a pilot. UAV 460 includes a component that is capable of capturing real-time content and providing the real-time content and/or sensor data to UAV handset 458. UAV 460 may include a set of sensors, such as GPS, a temperature sensor, an altitude sensor, a speed sensor, a pressure sensor, and/or the like.

Control unit 462 includes a component that is capable of permitting a user to control video, audio, lighting, door, and/or the like, settings in device 400. Control unit 462 connects to control network router 464. Control unit 462 may take the form of a tablet computer or user interface elements with control elements disposed therein. Control unit 462 may also take the form of a server that provides a user interface or API that is exposed to authorized user devices 205, and include control elements corresponding to the controllable settings of vehicle system 210. In some implementations, control unit 462 is user device 205 or is included in user device 205.

Control network router 464 includes a component that is capable of permitting control processor 414 to control audio/video components associated with a vehicle.

Router 466 includes a component that is capable of providing network connectivity to user devices 205, control unit 462, and/or the like. In other words, router 466 is capable of connecting devices of a vehicle to a personal area network (PAN) and/or a radio access network (RAN). Router 466 connects to control network router 464. In some implementations, router 466 permits other types of radio access network connectivity.

Vehicle control panel 468 includes a component that is capable of permitting a user to control video, audio, lighting, door, and/or the like, settings in a vehicle. Vehicle control panel 468 connects to control network router 464.

Ambient lighting device 470 includes a component that is capable of providing ambient lighting in a vehicle. Ambient lighting device 470 may receive an input from control unit 462 associated with adjusting a lighting setting of a vehicle. Ambient lighting device 470 connects to control network router 464.

CPE rack 472 includes a component that is capable of providing 5G connectivity to user devices 205, CPE 5G throughput device 446, and/or 4K video over 5G device 448. CPE rack 472 connects to network switch 418.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
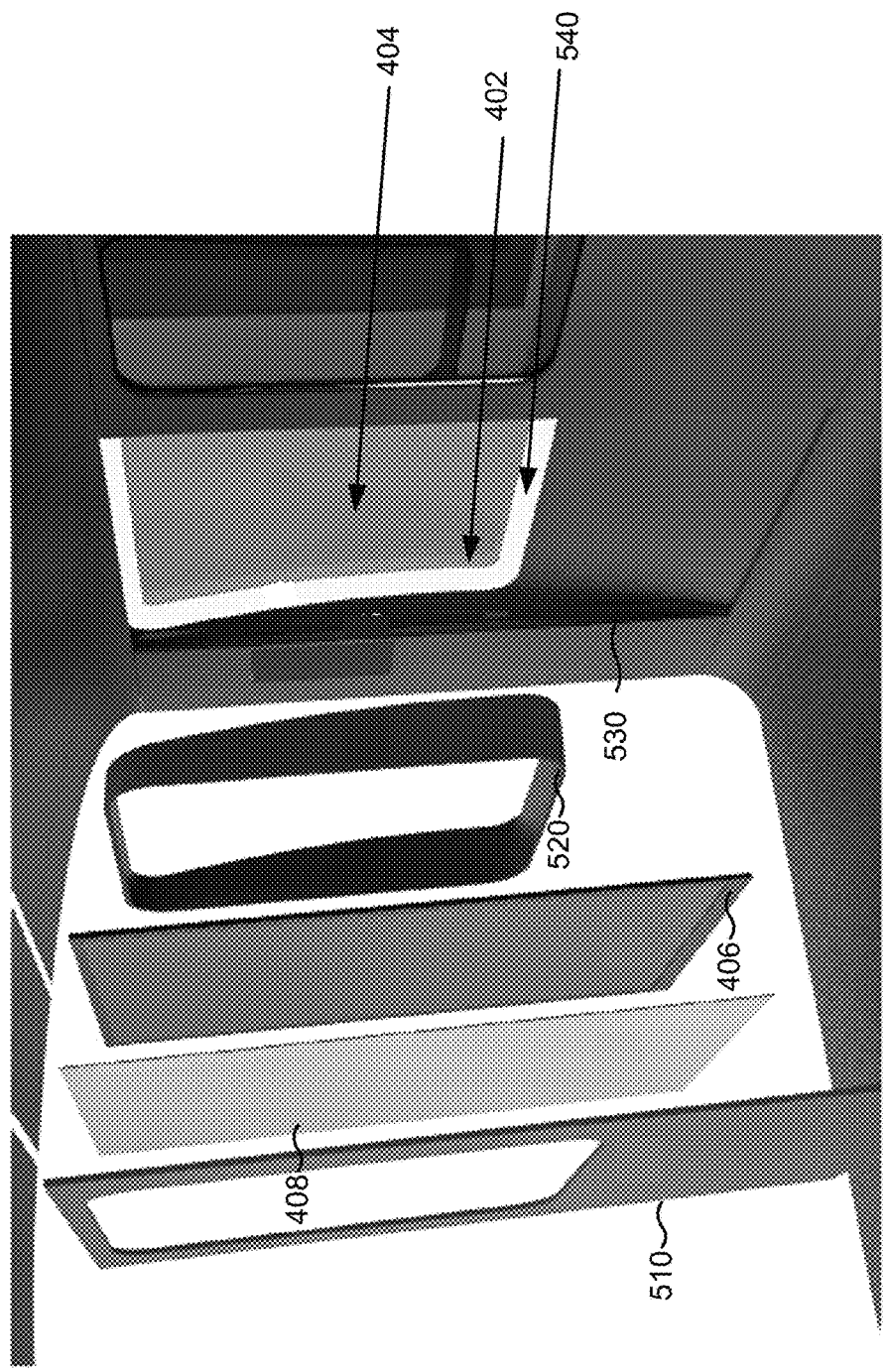
FIG. 5 is a diagram of an example window system of a vehicle system of FIG. 2.

FIG. 5 is a diagram of an example window system 500. Window system 500 may include one or more components of vehicle system 210. In some implementations, vehicle system 210 may include one or more window systems 500 and/or one or more components of window system 500. As shown in FIG. 5, window system 500 may include a panel 510, an interactive touch overlay 408, a display 406, a shroud 520, an internal frame 530, a backlight 404, a smart film 402, and an exterior window 540.

Panel 510 is an interior panel (e.g., interior to a vehicle) that partially covers interactive touch overlay 408. Panel 510 is comprised of any suitable material associated with an interior of a vehicle (e.g., a polymer-matrix composite (PMC), a fiber reinforced plastic (FRP), an alloy, and/or the like). Interactive touch overlay 408 is adjacent to panel 510 and adjacent to display 406. Interactive touch overlay 408 may comprise a mostly transparent material that includes elements to implement touch sensing capabilities (e.g., capacitive touch sensing). Display 406 may be implemented using LCD display technology, or other technology that allows for transparency. Display 406 is adjacent to shroud 520, which provides a buffer between display 406 and backlight 404. Shroud 520 is comprised of any suitable material for providing a buffer between display 406 and backlight 404, interfacing with internal frame 530, and/or permitting window system 500 to interface with internal frame 530.

Internal frame 530 is a frame associated with a vehicle. Internal frame 530 interfaces with shroud 520 to permit window system 500 to interface with the vehicle. Shroud 520 may connect to internal frame 530 via a connection mechanism. Panel 510 may connect to internal frame 530 via a connection mechanism. Interactive touch overlay 408 and/or display 406 may connect to panel 510 and/or shroud 520 via a connection mechanism.

Exterior window 540 is a window associated with a vehicle and is comprised of any suitable material, such as laminated glass, polycarbonate plastic, acrylic plastic, and/or the like. Backlight 404 is adjacent to display 406 and adjacent to smart film 402. Smart film 402 is adjacent to exterior window 540. Backlight 404 may connect to display 406 and/or smart film via a connection mechanism. Various connection mechanisms may connect components of window system 500 to permit window system 500 to remain in place during operation of a vehicle.

The number and arrangement of components shown in FIG. 5 are provided as an example. In practice, window system 500 may include additional components, fewer components, different components, or differently arranged components than those shown in FIG. 5. Additionally, or alternatively, a set of components (e.g., one or more components) of window system 500 may perform one or more functions described as being performed by another set of components of window system 500.

FIG. 6 is a flow chart of an example process 600 for providing interactive content via augmented reality overlays associated with a vehicle window system. In some implementations, one or more process blocks of FIG. 6 may be performed by vehicle system 210. In some implementations, one or more process blocks of FIG. 6 may be performed by another device or a group of devices separate from or including vehicle system 210, such as user device 205, station(s) 215, MME 220, SGW 225, PGW 230, HSS 235, content source 245, 5G network slice(s) 270, and/or orchestration entity 275.

As shown in FIG. 6, process 600 may include identifying first content to be provided for display via a window system of a vehicle (block 610). For example, vehicle system 210 may identify first content to be provided for display via window system 500 of a vehicle.

In some implementations, a vehicle, including vehicle system 210 and window system 500, may include an automobile, a bus, a train, a plane, a subway, a monorail, a trolley, another type of mass transit vehicle, and/or the like, that may travel along a pre-defined route, a random route, and/or the like. The route may be associated with various geographic features, such as buildings, venues, landmarks, natural objects, and/or the like. As the vehicle travels along the route, an occupant of the vehicle may desire to identify information associated with the geographic features, such as historical information, real-time information, upcoming information, and/or the like. In other words, the occupant may desire to identify information regarding surroundings of the vehicle.

In some implementations, the first content may correspond to content associated with the geographic features. For example, the first content may include information that identifies historical information, real-time information, upcoming information, etc. associated with the geographic features. As examples, the first content may include information identifying an upcoming event at a venue, information identifying a natural object, information identifying a name of a building, information identifying a business associated with a building, information identifying hours of operation of a business associated with a building, information identifying a current promotion at a business, information identifying a historical view, image, etc. associated with a building or landmark, information identifying a current weather condition associated with an area, information identifying historical facts associated with a geographical location, a building, a statue, a street, etc., and/or the like.

In some implementations, vehicle system 210 may identify the first content based on geolocation information associated with vehicle system 210. In some implementations, vehicle system 210 may include functionality for determining geolocation information of vehicle system 210. For example, vehicle system 210 may utilize GPS information, compass information, accelerometer information, signal triangulation information, and/or the like to determine geolocation information of vehicle system 210. In this way, vehicle system 210 may determine geolocation information of a vehicle, and identify the first content based on the geolocation information.

In some implementations, the first content may include metadata that identifies a geolocation to which the first content is applicable (e.g., geographic coordinates), that identifies a particular geographic feature to which the content is applicable, that identifies an entity associated with the first content, and/or the like. In some implementations, vehicle system 210 may receive and/or access the first content that includes the metadata. Additionally, or alternatively, vehicle system 210 may compare geolocation information, of the vehicle, and the metadata of the first content, and identify the first content based on the comparison. For example, as vehicle system 210 enters a particular geolocation, vehicle system 210 may identify first content that is applicable to the particular geolocation, that is applicable to particular geographic features of the geolocation, and/or the like. Additionally, or alternatively, vehicle system 210 may utilize map data when identifying the first content.

In some implementations, vehicle system 210 may receive the first content from a set of content sources 245, from UAV 460, from a set of IoT sensors, from a set of communication devices associated with other vehicles, and/or the like. Additionally, or alternatively, vehicle system 210 may request the first content, may receive push notifications, may access stored information, and/or the like. In some implementations, vehicle system 210 may store the first content, and identify the first content based on storing the first content.

In some implementations, the first content may include real-time content, such as content that is provided for display, that is received by vehicle system 210, that is provided to vehicle system 210, and/or the like, substantially concurrently with the occurrence of an underlying event associated with the first content. As examples, the first content may include real-time content captured by UAV 460, real-time sensor data associated with IoT sensors, real-time data associated with a geographic feature, and/or the like.

In some implementations, vehicle system 210 may identify different first content for different window systems 500 of the vehicle. For example, vehicle system 210 may access information that identifies an orientation and/or a position of each window system 500 of the vehicle, and may identify first content, for each respective window system 500, using the information that identifies the orientations and/or the positions. In other words, different geographic features may be viewable via different window systems 500 of the vehicle. As such, vehicle system 210 may identify different first content for different window systems 500 based on geographic features that might be viewable via the different window systems 500.

As an example, assume that a vehicle includes a set of four window systems 500, where a first window system 500 and a second window system 500 are substantially planar, where a third window system 500 and a fourth window system 500 are substantially planar, where the first window system 500 is horizontally opposed to the third window system 500, and where the second window system 500 is horizontally opposed to the fourth window system 500.

In this case, vehicle system 210 may identify particular first content, for the first window system 500, that corresponds to a geographic feature that is viewable through the first window system 500. Vehicle system 210 may identify that the particular first content is applicable to the second window system in the event that the geographic feature becomes viewable or is also viewable through the second window system 500.

Vehicle system 210 may identify other first content, for the third window system 500, that corresponds to another geographic feature that is viewable through the third window system 500 (e.g., because the third window system 500 is located on an opposite side of the vehicle as compared to the first window system 500 and the second window system 500). In other words, different geographic features may be viewable through different window systems 500 of the vehicle, and vehicle system 210 may thus identify different first content on a window system 500 basis.

In some implementations, vehicle system 210 may identify first content that is capable of being provided for display, concurrently, by multiple window systems 500. For example, vehicle system 210 may identify interrelated first content that is to be provided for display by multiple window systems 500 to generate a panoramic effect. That is, different window systems 500 may provide, for display, respective content that, in the aggregate, creates a unitary item of content.

In other cases, an occupant of a vehicle may desire to have information, that might otherwise be provided for display by a user device 205, be provided for display via window system 500 of a vehicle. In this way, the occupant may view content via a display 406 of window system 500 that is substantially larger than a display of a user device 205.

In some implementations, vehicle system 210 may establish connectivity with user device 205. For example, vehicle system 210 may establish a wired connection and/or a wireless connection with user device 205, such as via an audio/video interface, Bluetooth, Wi-Fi, near-field communication (NFC), RFID, and/or the like.

In some implementations, vehicle system 210 may identify the first content based on establishing connectivity with user device 205. For example, user device 205 may provide the first content to vehicle system 210, and vehicle system 210 may identify the first content based on receiving the first content. As examples, the first content may correspond to streaming media content stored and/or accessible by user device 205, application content associated with user device 205 (e.g., a gaming application, a productivity application, a streaming media application, and/or the like), and/or any other type of content that is stored by and/or accessible via user device 205.

In yet other cases, a content provider may desire to have content, such as advertisements, subsidized content, informational content, and/or the like, be provided for display via window system 500. In this case, vehicle system 210 may receive and store the first content, and may identify the first content based on the stored information. In some implementations, the content may include content metadata that identifies a geolocation to which the content is applicable, a time frame to which the content is applicable, a demographic to which the content is applicable, and/or the like. Additionally, or alternatively, vehicle system 210 may identify the content based on the content metadata and geolocation information of the vehicle, temporal information, user demographic information of occupants of the vehicle, and/or the like.

Further still, an occupant of the vehicle may desire to interact with window system 500 to visit particular websites, interact with particular applications, select particular content to be displayed, and/or the like. In some implementations, vehicle system 210 may execute an application, such as a web-browsing application, a streaming media application, and/or the like, and may provide, for display via window system 500, an interface associated with the application that permits an occupant to interact with the application. In such cases, vehicle system 210 may identify the first content based on executing the application.

While particular examples of the first content and/or processes of identification of the first content are described herein, it should be understood that the first content may correspond to any type of content that is capable of being provided for display via window system 500.

In some implementations, window system 500 (e.g., smart film 402) may be associated with a particular opacity while display 406 displays content. In some implementations, an opacity level may identify an opacity (or transparency) of smart film 402. For example, an opacity level of 0% may indicate that smart film 402 is to be substantially transparent, such that a view of real-world surroundings of the vehicle is substantially uninhibited by smart film 402. As another example, an opacity level of 100% may indicate that smart film 402 is to be substantially opaque, such that a view of real-world surroundings of the vehicle is substantially inhibited by smart film 402.

In some implementations, vehicle system 210 may identify, based on the content to be provided for display, an opacity level of window system 500 (e.g., smart film 402). For example, vehicle system 210 may identify an opacity level based on metadata associated with content, based on a content type of content, based on a user input, and/or the like.

As described elsewhere herein, smart film 402 may provide an opacity that corresponds to the opacity level while display 406 displays the content. In this way, smart film 402 may transition between states (e.g., an opaque state, a transparent state, and/or the like) based on the particular type of content that is to be provided for display. In other words, vehicle system 210 may selectively adjust an opacity of window system 500 based on the particular type of content that is to be provided for display to permit real-world surroundings to be viewed concurrently, to permit the content to be viewed more easily, to permit the content to be viewed with improved clarity, and/or the like.

By identifying the first content, vehicle system 210 may provide, for display via one or more components of window system 500, information associated with the first content as an augmented reality overlay. In this way, an occupant of the vehicle may identify, based on the augmented reality overlay, the first content, as described below.

As further shown in FIG. 6, process 600 may include providing, for display via the window system of the vehicle, information associated with the first content as a first augmented reality overlay based on identifying the first content (block 620). For example, vehicle system 210 may provide, for display via window system 500 of the vehicle, information associated with the first content as a first augmented reality overlay.

In some implementations, vehicle system 210 may provide, for display via display 406, information associated with the first content as an augmented reality overlay. For example, and in the situation where the first content is associated with a real-world geographic feature, display 406 may superimpose a particular augmented reality overlay, that corresponds to the real-world geographic feature, in association with the real-world geographic feature. In some implementations, vehicle system 210 may adjust an opacity level of window system 500 (e.g., smart film 402) such that smart film 402 is substantially transparent to permit a view of the real-world geographic feature to be substantially uninhibited by an opacity of smart film 402.

In some implementations, vehicle system 210 may determine a position of vehicle system 210 relative to the real-world geographic feature, and provide, for display, the augmented reality overlay based on the position of vehicle system 210 relative to the real-world geographic feature. For example, vehicle system 210 may compare a geolocation of the real-world geographic feature and a geolocation of vehicle system 210, and provide, for display via display 406, the augmented reality overlay based on the comparison such that the augmented reality overlay is superimposed in association with the real-world geographic feature.

In some implementations, vehicle system 210 may update a display of the augmented reality overlay based on a change in an orientation and/or a position of the vehicle. For example, vehicle system 210 may update a display of the augmented reality overlay such that the augmented reality overlay remains superimposed in association with the real-world geographic feature as the vehicle changes position and/or orientation in relation to the real-world geographic feature.

In some implementations, vehicle system 210 may prevent additional content from being provided for display by window system 500. For example, vehicle system 210 may receive information that identifies that an occupant is interacting with particular content that is being provided for display via window system 500, and may prevent additional content from being displayed based on the information that identifies that the occupant is interacting with the particular content.

As an example, assume that a vehicle passes a geographic feature, such as a restaurant, and that an advertisement for the restaurant is provided for display by window system 500. In this case, an occupant may interact with the advertisement to identify additional information regarding the restaurant. As the vehicle changes position and/or as the occupant continues to interact with the advertisement, vehicle system 210 may prevent additional content from being provided for display. In some implementations, vehicle system 210 may determine that a threshold amount of time has elapsed since detecting a user interaction with window system 500, and may provide additional content for display based on the threshold amount of time having elapsed.

In some implementations, vehicle system 210 may update a display of the augmented reality overlay such that the augmented reality overlay appears to transition from being provided for display via a first window system 500 to being provided for display via a second window system 500. For example, the real-world geographic feature, to which the augmented reality is superimposed, may transition from being viewable via the first window system 500 to the second window system 500. In this case, vehicle system 210 may display the augmented reality overlay in association with the second window system 500 as the real-world geographic feature becomes viewable via the second window system 500.

In some implementations, vehicle system 210 may provide, for display via display 406, information associated with the first content as an augmented reality overlay in situations where the augmented reality overlay does not correspond to a real-world geographic feature. In other words, vehicle system 210 may provide, for display via display 406, other types of content as augmented reality overlays (e.g., video content, streaming media content, pre-recorded content, and/or the like).

In some implementations, vehicle system 210 may adjust an opacity level of window system 500 (e.g., smart film 402) such that smart film 402 is more opaque than transparent while the augmented reality overlay, that does not correspond to a real-world geographic feature, is provided for display. In this case, a view of real-world surroundings may be inhibited by an opacity of smart film 402.

In this way, vehicle system 210 may provide, for display via display 406, information associated with the first content as an augmented reality overlay, thereby permitting an occupant of the vehicle to view and/or interact with the augmented reality overlay. Further, vehicle system 210 may receive information that identifies a user interaction with window system 500, and provide updated content for display, as described below.

As further shown in FIG. 6, process 600 may include receiving information associated with a user interaction with the window system of the vehicle based on providing, for display via the window system of the vehicle, the information associated with the first content as the first augmented reality overlay (block 630). For example, vehicle system 210 may receive information associated with a user interaction with the window system based on an occupant of the vehicle performing a touch gesture in association with window system 500.

In some implementations, the user interaction may correspond to a touch gesture. For example, an occupant of the vehicle may perform a touch gesture, such as a tap, a double tap, a flick, a drag, a pinch, a touch and hold, a scroll, a pan, a swipe, and/or the like, in association with interactive touch overlay 408. In some implementations, interactive touch overlay 408 may detect the touch gesture, and provide information associated with the touch gesture to vehicle system 210.

In some implementations, vehicle system 210 may receive, via interactive touch overlay 408, information associated with a user interaction, and may identify updated content to be provided for display via display 406 based on the information associated with the user interaction. In other words, different types of touch gestures may solicit different types of updated display of content. In some implementations, vehicle system 210 may adjust an opacity of window system 500 (e.g., smart film 402) based on detecting a touch gesture.

In some implementations, an occupant of the vehicle may perform the touch gesture to select particular content to be displayed, to interact with the content, to identify information associated with real-world geographic features, to interact with an application, and/or the like. In this way, an occupant of the vehicle may interact with the first content by performing a touch gesture, thereby permitting vehicle system 210 to identify second content to be provided for display, as described below.

As further shown in FIG. 6, process 600 may include identifying second content based on the information associated with the user interaction with the window system of the vehicle (block 640), and providing, for display via the window system of the vehicle, information associated with the second content based on identifying the second content (block 650).

For example, vehicle system 210 may identify second content based on the information associated with the touch gesture. In some implementations, the second content may correspond to updated first content. In other words, an occupant of the vehicle may interact with the first content to cause second content to be provided for display. As an example, assume that the first content corresponds to information identifying a building. In this case, the second content may correspond to information regarding the building, information regarding businesses associated with the building, information associated with events of the building, information associated with hours of operations, and/or the like. For example, the occupant may perform a touch gesture to identify additional information regarding the building.

As another example, assume that the first content corresponds to information identifying a set of articles (e.g., news articles, sports articles, entertainment articles, etc.). In this case, the second content may correspond to a particular article of the set of articles. For example, the occupant may perform a touch gesture to select a particular article to be provided for display. As another example, the first content may correspond to information identifying a set of videos, and the second content may correspond to a particular video of the set of videos.

It should be understood that the first content and the second content may be any type of content that is capable of being provided for display by display 406. As such, while particular examples are provided herein, it should be understood that other implementations include other types of content.

In some implementations, vehicle system 210 may selectively adjust an opacity of window system 500 based on the particular content that is being provided for display, based on a user interaction, and/or the like. For example, vehicle system 210 may selectively adjust an opacity of window system 500 (e.g., smart film 402) such that a view of external surroundings of the vehicle is substantially uninhibited, is substantially inhibited, is relatively uninhibited, is relatively inhibited, and/or the like.

As an example, if the content corresponds to a real-world geographic feature (e.g., is superimposed as an augmented reality overlay), then vehicle system 210 may adjust an opacity such that a view of the real-world geographic feature is substantially uninhibited. In this way, an occupant may view the content and the real-world geographic feature concurrently.

As another example, if the content is multimedia content that does not correspond to a particular real-world geographic feature, then vehicle system 210 may adjust an opacity such that the content may be viewed more easily, with improved clarity, etc. than as compared to if window system 500 is relatively transparent. In this way, an occupant may view the content and may not view external surroundings of the vehicle (e.g., because the content does not apply to the real-world geographic surroundings).

In some implementations, vehicle system 210 may selectively adjust an opacity based on a user input. For example, an occupant of the vehicle may interact with window system 500 to cause vehicle system 210 to selectively adjust an opacity.

In some implementations, vehicle system 210 may receive information associated with a user interaction with a first window system 500 of the vehicle, and provide, for display via a second window system 500, updated information based on the user interaction with the first window system 500. For example, an occupant may interact with the first window system 500, which may cause other window systems 500 of the vehicle to update respective displays.

In some implementations, vehicle system 210 may receive information associated with a user interaction with user device 205, and provide, for display via one or more window systems 500, updated information based on the information on the user interaction with user device 205. For example, an occupant may interact with user device 205, which may cause one or more window systems 500 to update respective displays.

In this way, some implementations described herein provide a vehicle system 210 that is capable of providing augmented reality overlays for display via window systems 500. In this way, occupants of a vehicle may interact with the augmented reality overlays to identify information associated with a route via which the vehicle is travelling, to identify information associated with a geolocation, to view content, to interact with an application, and/or the like.

As such, some implementations described herein reduce a number of requests, by user devices 205 of occupants of a vehicle, for content, thereby conserving processor, memory, and/or battery resources of user devices 205, and/or conserving network resources.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
  one or more processors to:
    for each window system of a set of window systems of a vehicle, determine a geographic location viewable through a respective window system based on an orientation of the respective window system and a geographic location of the vehicle;
    for each window system of a set of window systems of the vehicle, identify first content to be provided for display via a respective window system of the vehicle based on the geographic location viewable through the respective window system, different first content being identified for a window system, of the set of window systems, than for another window system, of the set of window systems where the window system comprises:
a smart film;
a display; and
a touch overlay, and each window system of the set of window systems being controllable independently from one another by the one or more processors;

provide, for display via each window system of the set of window systems, information associated with the first content as a first augmented reality overlay based on identifying the first content;

receive information associated with a user interaction with the window system of the vehicle based on providing, for display via the window system of the vehicle, the information associated with the first content as the first augmented reality overlay;

identify second content based on the information associated with the user interaction with the window system of the vehicle;

provide, for display via the window system of the vehicle and independent of the other window system, information associated with the second content based on identifying the second content;

determine that the second content is of a particular type of content or a plurality of types of content;

cause the smart film to transition to an opaque state based on providing the information associated with the second content for display, wherein the one or more processors, when causing the smart film to transition to the opaque state, are to:

select an opacity level for the opaque state based on the particular type of content or the plurality of types of content; and cause the smart film to transition to the opaque state at the opacity level; and prevent additional information, associated with the vehicle changing position, from being provided for display, while the information associated with the second content is being provided for display, as the vehicle changes position based on the user interaction with the window system, the additional information being prevented from being provided for display for a threshold amount of time since the user interaction was detected.

2. The device of claim 1, where the one or more processors are further to:

identify geolocation information associated with the vehicle; and where the one or more processors, when identifying the first content, are to:

identify the first content based on the geolocation information associated with the vehicle.

3. The device of claim 1, where the one or more processors are further to:

establish connectivity with a user device; and where the one or more processors, when identifying the first content, are to:

identify the first content based on establishing connectivity with the user device.

4. The device of claim 1, where the one or more processors are further to:

identify third content that is to be provided for display via the other window system of the vehicle, the third content being different than the first content and the second content; and provide, for display via the other window system of the vehicle, information associated with the third content.

5. The device of claim 1, where the one or more processors are further to:

identify a set of real-world geographic features; and where the one or more processors, when providing the information associated with the first content as the first augmented reality overlay, are to:

provide the information associated with the first content as the first augmented reality overlay in association with a real-world geographic feature of the set of real-world geographic features.

6. The device of claim 1, where the one or more processors are further to:

synchronize a third content between each window system of the set of window systems using a request animation frame technique.

7. The device of claim 1, wherein the one or more processors are further to:

receive, from an unmanned aerial vehicle, information associated with the first content; and where the one or more processors, when identifying the first content, are to:

identify the first content based on receiving the information associated with the first content from the unmanned aerial vehicle.

8. The device of claim 1, wherein the user interaction with the window system of the vehicle comprises a touch gesture.

9. A system comprising:

one or more devices to:

for each window system of a set of window systems of a vehicle, determine a geographic location viewable through a respective window system based on an orientation of the respective window system and a geographic location of the vehicle;

for each window system of a set of window systems of the vehicle, identify first content to be provided for display via a respective window system of the vehicle based on the geographic location viewable through the respective window system, different first content being identified for a window system, of the set of window systems, than for another window system, of the set of window systems where the window system comprises:
a smart film capable of transitioning from an opaque state to a transparent state,
a touch overlay; and
a display, and each window system of the set of window systems being controllable independently from one another by the one or more devices;

provide, for display via each window system of the set of window systems, information associated with the first content as a first augmented reality overlay based on identifying the first content;

receive information associated with a user interaction with the window system of the vehicle based on providing, for display via the window system of the vehicle, the information associated with the first content as the first augmented reality overlay;

identify second content based on the information associated with the user interaction with the window system of the vehicle;
provide, for display via the window system of the vehicle and independent of the other window system, information associated with the second content based on identifying the second content;
determine that the second content is of a particular type of content or a plurality of types of content;
cause the smart film to transition to an opaque state based on providing the information associated with the second content for display,
 wherein the one or more devices, when causing the smart film to transition to the opaque state, are to:
  select an opacity level for the opaque state based on the particular type of content or the plurality of types of content; and
  cause the smart film to transition to the opaque state at the opacity level; and
prevent additional information, associated with the vehicle changing position, from being provided for display, while the information associated with the second content is being provided for display, as the vehicle changes position based on the user interaction with the window system,
 the additional information being prevented from being provided for display for a threshold amount of time since the user interaction was detected.

10. The system of claim 9, where the one or more devices are further to:
determine a geographic location of the vehicle; and
where the one or more devices, when identifying the first content, are to:
 identify the first content based on the geographic location of the vehicle.

11. The system of claim 9, where the one or more devices are further to:
receive, from a user device, information associated with the first content; and
where the one or more devices, when identifying the first content, are to:
 identify the first content based on receiving the information associated with the first content.

12. The system of claim 9, where the one or more devices are further to:
provide, for display via the other window system of the vehicle, information associated with the second content based on receiving the information associated with the user interaction with the window system of the vehicle.

13. The system of claim 9, where the one or more devices are further to:
identify a real-world geographic feature;
determine that the information associated with the first content is associated with the real-world geographic feature; and
where the one or more devices, when providing the information associated with the first content as the first augmented reality overlay, are to:
 provide the information associated with the first content as the first augmented reality overlay based on determining that the information associated with the first content is associated with the real-world geographic feature,
  the first augmented reality overlay being superimposed in association with the real-world geographic feature.

14. The system of claim 9, wherein the one or more devices, when identifying the second content, are to:
identify the second content based on a type of the user interaction.

15. A method, comprising:
for each window system of a set of window systems of a vehicle, determining, by a device, a geographic location viewable through a respective window system based on an orientation of the respective window system and a geographic location of the vehicle;
for each window system of a set of window systems of the vehicle, identifying, by the device, first content to be provided for display via a respective window system of the vehicle based on the geographic location viewable through the respective window system,
 a different first content being identified for a window system, of the set of window systems, than for another window system, of the set of window systems,
 where the window system comprises:
  a smart film capable of transitioning between an opaque state and a transparent state,
  a display capable of displaying information associated with the first content, as a first augmented reality overlay, and the different first content, and
  a touch overlay capable of detecting user interaction and providing, to the device, the information associated with the user interaction, and
 each window system of the set of window systems being controllable independently from one another by the device;
providing, by the device and for display via the window system of the set of window systems, the information associated with the first content as the first augmented reality overlay based on identifying the first content;
receiving, by the device, information associated with a user interaction with the window system of the vehicle based on providing, for display via the window system of the vehicle, the information associated with the first content as the first augmented reality overlay;
identifying, by the device, second content based on the information associated with the user interaction with the window system of the vehicle;
providing, by the device and for display via the window system of the vehicle and independent of the other window system, information associated with the second content based on identifying the second content;
determining, by the device, that the second content is of a particular type of content or a plurality of types of content;
causing, by the device, the smart film to transition to an opaque state based on providing the information associated with the second content for display,
 wherein causing the smart film to transition to the opaque state comprises:
  selecting an opacity level for the opaque state based on the particular type of content or the plurality of types of content; and
  causing the smart film to transition to the opaque state at the opacity level; and
preventing, by the device, additional information, associated with the vehicle changing position, from being provided for display, while the information associated with the second content is being provided for display, as the vehicle changes position based on the user interaction with the window system, the additional information being prevented from being provided for display for a threshold amount of time since the user interaction was detected.

16. The method of claim 15, further comprising:
identifying geolocation information associated with the vehicle; and
where identifying the first content comprises:
identifying the first content based on the geolocation information associated with the vehicle.

17. The method of claim 15, further comprising:
receiving, from an unmanned aerial vehicle, information associated with the first content; and
where identifying the first content comprises:
identifying the first content based on receiving the information associated with the first content from the unmanned aerial vehicle.

18. The method of claim 15, further comprising:
superimposing the first augmented reality overlay in association with a real-world geographic feature; and
where providing the information associated with the first content as the first augmented reality overlay, comprises:
providing, for display via the window system of the vehicle, the information associated with the first content based on superimposing the first augmented reality overlay in association with the real-world geographic feature.

19. The method of claim 15, further comprising:
synchronizing a third content between each window system of the set of window systems using a request animation frame technique.

20. The method of claim 15, wherein the user interaction with the window system of the vehicle comprises a touch gesture; and
wherein identifying the second content comprises:
identifying the second content based on a type of the touch gesture.

\* \* \* \* \*